(12) United States Patent
Wexler et al.

(10) Patent No.: US 8,683,041 B2
(45) Date of Patent: Mar. 25, 2014

(54) SERVICE LEVEL MANAGEMENT SYSTEM (75) Inventors: Asaf Wexler, Foster City, CA (US); Yoav Dembak, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 373 days.

(21) Appl. No.: 12/635,770

(22) Filed: Dec. 11, 2009

(65) Prior Publication Data

US 2010/0094916 A1 Apr. 15, 2010

Related U.S. Application Data (63) Continuation of application No. 11/682,426, filed on Mar. 6, 2007, now Pat. No. 7,693,996.

(60) Provisional application No. 60/779,706, filed on Mar. 6, 2006.

(51) Int. Cl.
*G06F 15/173* (2006.01)

(52) U.S. Cl.
USPC .......................................... 709/226; 709/220

(58) Field of Classification Search
USPC .................................. 709/226, 220
See application file for complete search history.

(56) References Cited

U.S. PATENT DOCUMENTS

| | | | |
|---|---|---|---|
| 6,108,700 A | 8/2000 | Macabee et al. | |
| 6,151,624 A * | 11/2000 | Teare et al. | 709/217 |
| 6,453,345 B2 | 9/2002 | Trcka et al. | |
| 6,701,459 B2 * | 3/2004 | Ramanathan et al. | 714/37 |
| 6,792,460 B2 | 9/2004 | Oulu et al. | |
| 6,801,940 B1 * | 10/2004 | Moran et al. | 709/224 |
| 6,813,635 B1 * | 11/2004 | Jorgenson | 709/225 |
| 6,813,637 B2 | 11/2004 | Cable | |
| 6,944,678 B2 | 9/2005 | Lu et al. | |
| 6,970,933 B1 | 11/2005 | Masters | |
| 7,032,017 B2 | 4/2006 | Chow et al. | |
| 7,206,848 B1 | 4/2007 | Zara et al. | |
| 7,272,646 B2 | 9/2007 | Cooper et al. | |
| 7,392,160 B2 * | 6/2008 | Wicks | 702/186 |
| 7,401,159 B1 | 7/2008 | Aviani et al. | |
| 7,506,047 B2 | 3/2009 | Wiles | |
| 7,508,764 B2 | 3/2009 | Back et al. | |
| 7,519,702 B1 | 4/2009 | Allan | |
| 7,533,179 B2 * | 5/2009 | Tarquini et al. | 709/228 |
| 7,539,746 B2 | 5/2009 | Bankier et al. | |
| 7,543,051 B2 | 6/2009 | Greifeneder et al. | |
| 7,624,047 B1 | 11/2009 | Round | |
| 7,693,996 B2 | 4/2010 | Wexler | |
| 7,937,470 B2 | 5/2011 | Curley et al. | |

(Continued)

OTHER PUBLICATIONS

Berners-Lee, T., Hypertext Transfer Protocol—HTTP/1.0, RFC 1945, [online], May 1996, whole document, [retrieved on Dec. 12, 2011]. Retrieved from the internet<URL:http://tools.ietf.org/pdf/rfc1945.pdf.>.

*Primary Examiner* — Tammy Nguyen (57) ABSTRACT

A method for controlling and maintaining a level of service of web applications is disclosed. The method includes generating a context for each request sent from a client to a web server and for each reply sent from a web server to a client. Then it is determined whether the context belongs to an identified transaction. Statistics respective of the identified transaction is then gathered. Further, a determination is made whether at least one policy predefined for the identified application is violated. A plurality of corrective actions are performed if at least one policy is determined to be violated.

21 Claims, 5 Drawing Sheets

(56) References Cited

U.S. PATENT DOCUMENTS

| | | |
|---|---|---|
| 2002/0013849 A1 | 1/2002 | Schweitzer et al. |
| 2002/0065911 A1 | 5/2002 | von Klopp et al. |
| 2002/0073211 A1 | 6/2002 | Lin et al. |
| 2002/0083371 A1 | 6/2002 | Ramanathan et al. |
| 2002/0103663 A1 | 8/2002 | Bankier et al. |
| 2002/0103896 A1 | 8/2002 | von Klopp |
| 2002/0120727 A1 | 8/2002 | Curley et al. |
| 2002/0194342 A1 | 12/2002 | Lu et al. |
| 2003/0014464 A1 | 1/2003 | Deverill et al. |
| 2003/0055883 A1 | 3/2003 | Wiles |
| 2003/0061360 A1 * | 3/2003 | Chow et al. ............ 709/228 |
| 2003/0078987 A1 | 4/2003 | Serebrennikov |
| 2003/0145079 A1 | 7/2003 | Breese et al. |
| 2003/0187946 A1 | 10/2003 | Cable |
| 2003/0195961 A1 | 10/2003 | Breese et al. |
| 2003/0200293 A1 | 10/2003 | Fearn et al. |
| 2003/0221000 A1 | 11/2003 | Cherkasova et al. |
| 2004/0015610 A1 | 1/2004 | Treadwill |
| 2004/0103315 A1 | 5/2004 | Cooper et al. |
| 2004/0107125 A1 | 6/2004 | Guheen et al. |
| 2004/0122942 A1 | 6/2004 | Green et al. |
| 2004/0138939 A1 | 7/2004 | Theiler |
| 2004/0243349 A1 | 12/2004 | Greifeneder et al. |
| 2005/0039172 A1 | 2/2005 | Rees et al. |
| 2005/0050212 A1 | 3/2005 | Mills et al. |
| 2005/0066011 A1 | 3/2005 | Wicks |
| 2005/0132030 A1 | 6/2005 | Hopen et al. |
| 2005/0262098 A1 | 11/2005 | Manfredi et al. |
| 2006/0064486 A1 | 3/2006 | Baron et al. |
| 2006/0095570 A1 | 5/2006 | O'Sullivan |
| 2006/0230437 A1 | 10/2006 | Boyer et al. |
| 2007/0058632 A1 | 3/2007 | Back et al. |
| 2007/0121626 A1 | 5/2007 | Shepard |
| 2007/0143827 A1 | 6/2007 | Nicodemus et al. |
| 2007/0150568 A1 | 6/2007 | Ruiz |
| 2007/0208852 A1 | 9/2007 | Wexler et al. |
| 2008/0098453 A1 | 4/2008 | Hinton et al. |
| 2008/0163064 A1 | 7/2008 | Swildens et al. |
| 2009/0313273 A1 | 12/2009 | Wexler et al. |

* cited by examiner

SERVICE LEVEL MANAGEMENT SYSTEM

CROSS REFERENCE TO RELATED APPLICATIONS

This application is a continuation of the U.S. patent application Ser. No. 11/682,426 filed on Mar. 6, 2007, which claims priority to a U.S. provisional application No. 60/779,706 filed on Mar. 6, 2006.

TECHNICAL FIELD

The present invention relates generally to controlling and managing the performance of web applications.

BACKGROUND

Enterprises and organizations expose their business information and functionality on the web through software applications, usually referred to as "web applications." Web applications provide great opportunities for an organization. Web applications use the Internet technologies and infrastructures. These applications are generally event-driven software programs which react to hyper text transfer protocol (HTTP) requests from the client. The applications are generally executed on application servers, constructed according to N-tier architecture, in which presentation, business logic, and data access layers are kept separate. Recently, web applications have evolved into large-scale applications that demand more sophisticated computing services.

Figure 1:
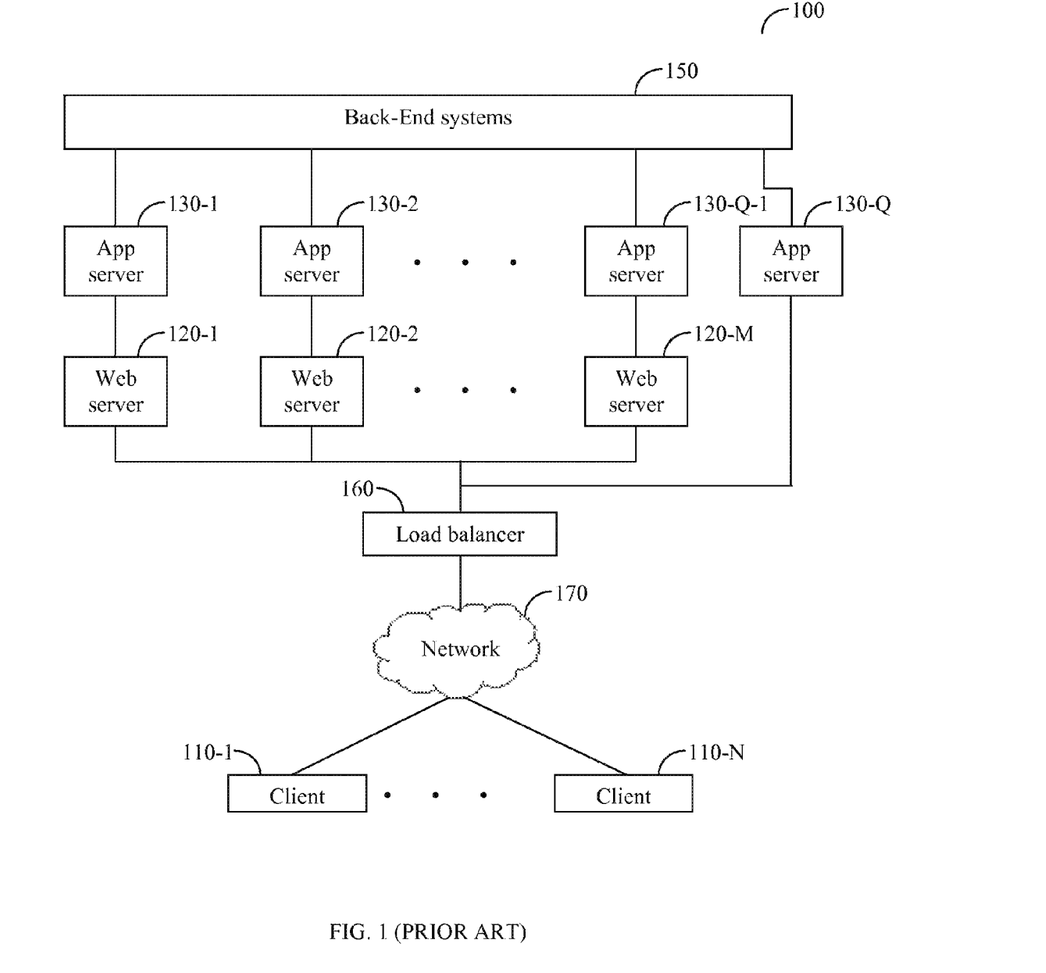
FIG. 1 is a non-limiting network system utilized for executing web applications (prior art).

FIG. 1 shows an exemplary network system 100 that is utilized for executing web applications. System 100 includes clients 110-1 through 110-N, web servers 120-1 through 120-M, application servers 130-1 through 130-Q, back-end systems 150, a load balancer 160, and a network 170. Clients 110 submit requests (e.g., HTTP requests) to web servers 120 through network 170. Load balancer 160 distributes the requests among the servers 120 to balance the load between servers 120 and 30. Each of web servers 120 dynamically generates presentation, for example, using servlets, or extensible markup language (XML), extensible style-sheet language (XSL), and the likes. Application servers 130 are often responsible for deploying and running the business logic layer and for interacting with and integrating various enterprise-wide resources, such as web servers 120, and back-end systems 150. The back-end system 150 may include, for example, a database and a legacy system.

Workload may be distributed across a cluster of application servers 130 in different ways. For example, application code may be replicated across multiple application servers in the cluster, enabling a given request to be processed by any of these multiple application servers 130. Also, application code may be logically partitioned over multiple application servers 130, e.g., so that a particular server 130 is responsible for performing particular types of operations. This type of application partitioning may improve the application performance. For example, data-intensive application logic may be configured to run on an application server that is closest to a data source, in order to reduce the latencies associated with accessing remotely located data.

As the web and application servers 120 and 130 become busier with handling more and more requests, the quality and level of service sharply decrease. With existing load balancing capabilities, once the servers are saturated, the quality of service drops drastically for all clients accessing a web site. Currently, a standard tool that automatically monitors, manages, and controls the operation and load of applications and servers is not found in the related art. The management and control of web applications mostly relies on technical personnel. This results with many drawbacks including unpredictable level of service and uncontrolled user experience as well as costly maintenance of applications. Additionally, the application management is static, i.e., the ability to detect problems and solve them in real-time is not feasible. Another major drawback is the inability to deliver services according to predefined service level agreements (SLAs), as the ability to provide committed services increasingly becomes a competitive requirement. Yet another major drawback is the inability to balance the load differently per application in servers that are installed with multiple applications.

It would be therefore advantageous to provide a network solution for automatically managing and controlling web applications that overcome the drawbacks mentioned in the prior art.

SUMMARY OF THE INVENTION

The present invention includes a service level management (SLM) system in a network with a plurality of clients and a plurality of web servers. The SLM system includes a traffic processor for processing data traffic sent from a the plurality of clients and from a the plurality of web servers; an application learner for identifying transactions sent from the plurality of clients; a monitor for monitoring and generating statistics respective of the operation of the web servers and their respective web applications; and a controller for performing corrective actions according to a plurality of predefined policies.

The present invention also includes a method for controlling and maintaining a level of service of web applications. The method includes generating a context for each request sent from a client to a web server and for each reply sent from a web server to a client; determining whether the context belongs to an identified web application; gathering statistics respective of the identified web application; determining whether at least one policy predefined for the identified application is violated; and performing a plurality of corrective actions if at least one policy is determined to be violated.

The present invention also includes a computer program product including a computer-readable medium comprising software instructions operable to enable a computer to perform a method for controlling and maintaining a level of service of web applications The program product causes a computer to execute the processes of generating a context for each request sent from a client to a web server and for each reply sent from a web server to a client; determining whether the context belongs to an identified web application gathering statistics respective of the identified web application; determining whether at least one policy predefined for the identified application is violated; and performing a plurality of corrective actions if at least one policy is determined to be violated.

DETAILED DESCRIPTION

Figure 2:
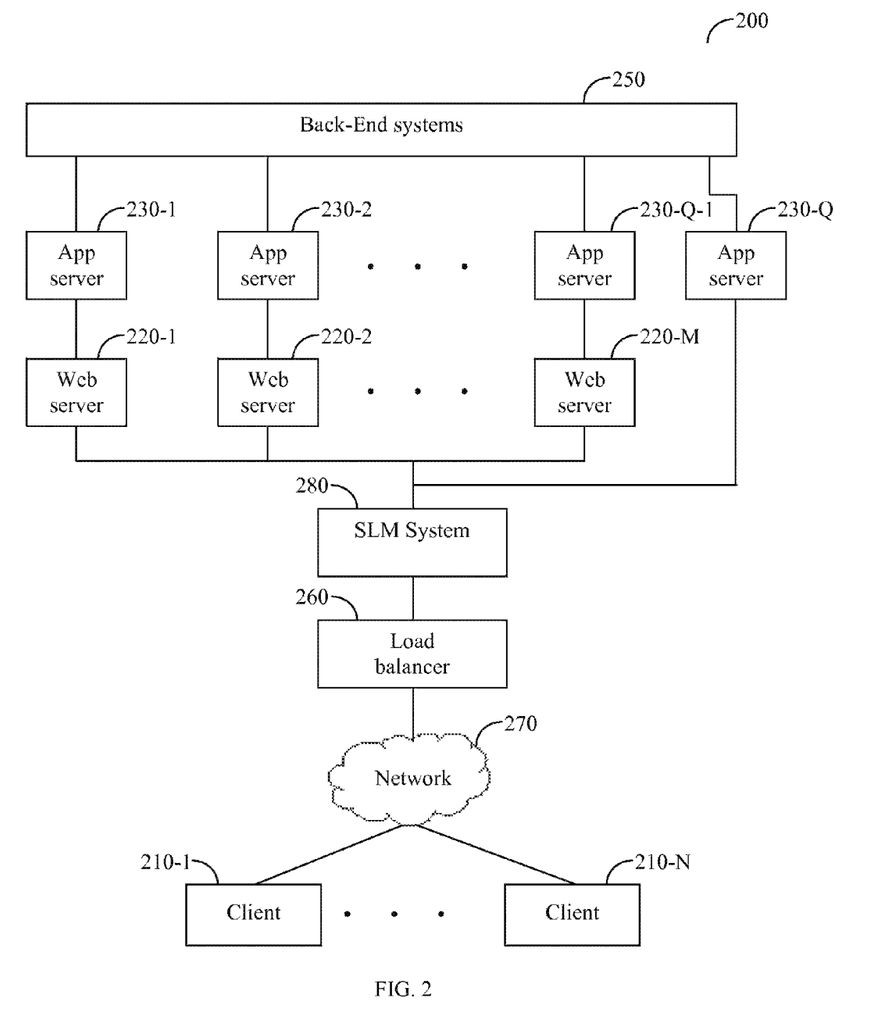
FIG. 2 is a diagram of a network system constructed in accordance with an exemplary embodiment of the present invention.

FIG. 2 shows a non-limiting and exemplary diagram of a network system 200 constructed in accordance with one embodiment of the present invention. System 200 includes clients 210-1 through 210-N, web servers 220-1 through 220-M, application servers 230-1 through 230-Q connected to backend systems 250, a load balancer 260, and a network 270. System 200 further includes a service level management (SLM) system 280 that allows the maintaining of a consistent lever of service of web applications. Web servers 220 process requests sent from clients and responds with the processing result. Application servers 230 execute the business logic of the web applications and communicate with back-end systems 250, which implement the data layer of the applications. In some configurations, a web server and a web application may act as a single entity, e.g., web application 230-Q. Load balancer 260 mainly distributes incoming requests to servers 220 and 230 that run the applications to which the requests are targeted.

SLM system 280 controls and manages applications executed by servers 220 and 230 in real-time, and thus ensures a committed level of service. The level of service may be defined by a service eve agreement (SLA) and be different for each application. With this aim, SLM system 280 learns the structure of a web-application, monitors the operation of the application, and controls the processing of incoming requests to achieve optimal performance and level of service. In an exemplary embodiment shown in FIG. 2 SLM system 280 is configured to operate in the line of traffic, i.e., traffic passing directly through system 280 to web servers 220.

Figure 3:
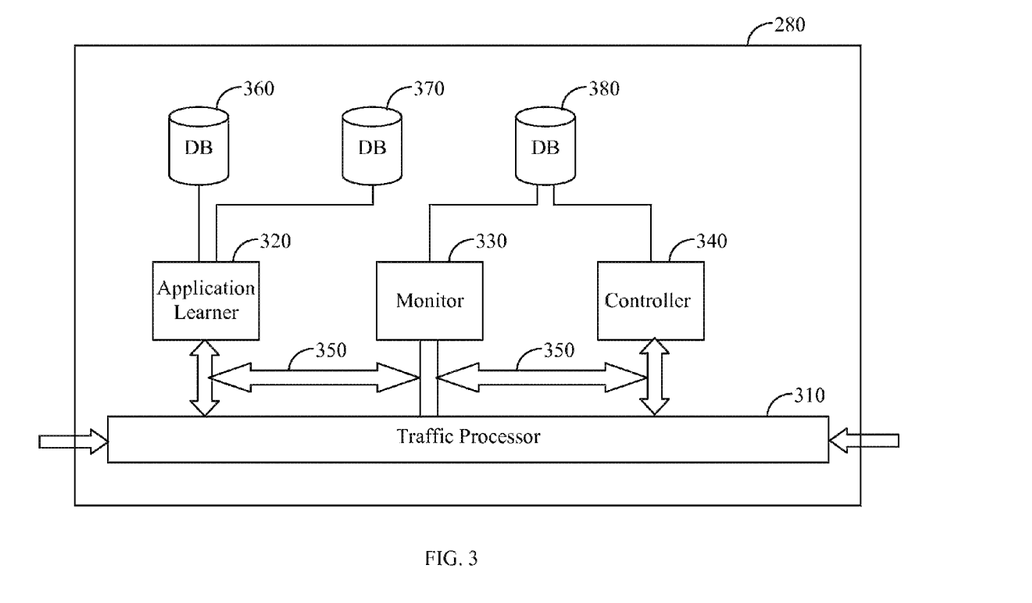
FIG. 3 is a block diagram of the SLM system disclosed in accordance with an embodiment of the present invention.

FIG. 3 shows a non-limiting block diagram of SLM system 280 disclosed in accordance with an embodiment of the present invention. SLM system 280 comprises a traffic processor 310, an application learner 320, a monitor 330, and a controller 340 connected to a common bus 350. SLM system 280 further includes databases 360 and 370 coupled to application learner 320 and a database 380 coupled to monitor 330 and controller 340. In other embodiments, SLM system 280 includes a single database commonly coupled to application learner 320, monitor 330, and controller 340.

Traffic processor 310 receives HTTP requests submitted by clients 210 as well as replies sent from servers 220 and 230 (see also FIG. 2). Specifically, once a session is established with a client 210 a client connection handler (not shown) is allocated. The client connection handler waits for data, i.e., a HTTP request submitted by a client 210, and once received, the data is sent to a parser (not shown). Both the parser and the client connection handler are part of the traffic processor 30. While processing the request, the parser returns a context of the request. A context is a joined HTTP request-reply entity. The context fields include, but are not limited to, a site name, a HTTP method, a URL, request parameters, HTTP cookies, a HTTP status code, a HTTP server, a HTTP content type, a HTTP content length, a HTML title field, and the like. The context is sent to application learner 320, monitor 330, and controller 340. The incoming request is forwarded to one of web servers 220.

When load-balance or SLM schemes are utilized by controller 340, requests may be stalled or dropped. When a reply, i.e., HTTP response is sent from a web server 230, a web sewer (WS) connection handler (not shown), in the traffic processor, is allocated. The WS connection handler waits until the header of the response arrives, and then forwards the header to the parser, which sends the context to application learner 320, monitor 330, and controller 340. In addition, the incoming response is sent to a client 210 through the respective client connection handler, i.e., the response is sent to the client that initiated the request.

Application learner 320 identifies web applications their transactions and modules and registers the learnt information in a classify data structure (CDS). The CDS includes a list of identified sites, for each site a list of its applications, and for each application a list transactions and modules that construct the application. A module is a group of transactions. Application learner 320 further generates for display purposes a site tree, which includes all discovered applications that belong to a designated site. The CDS is used in real-time to classify incoming requests to applications. The site tree and the CDS are saved in database 370.

Figure 5:
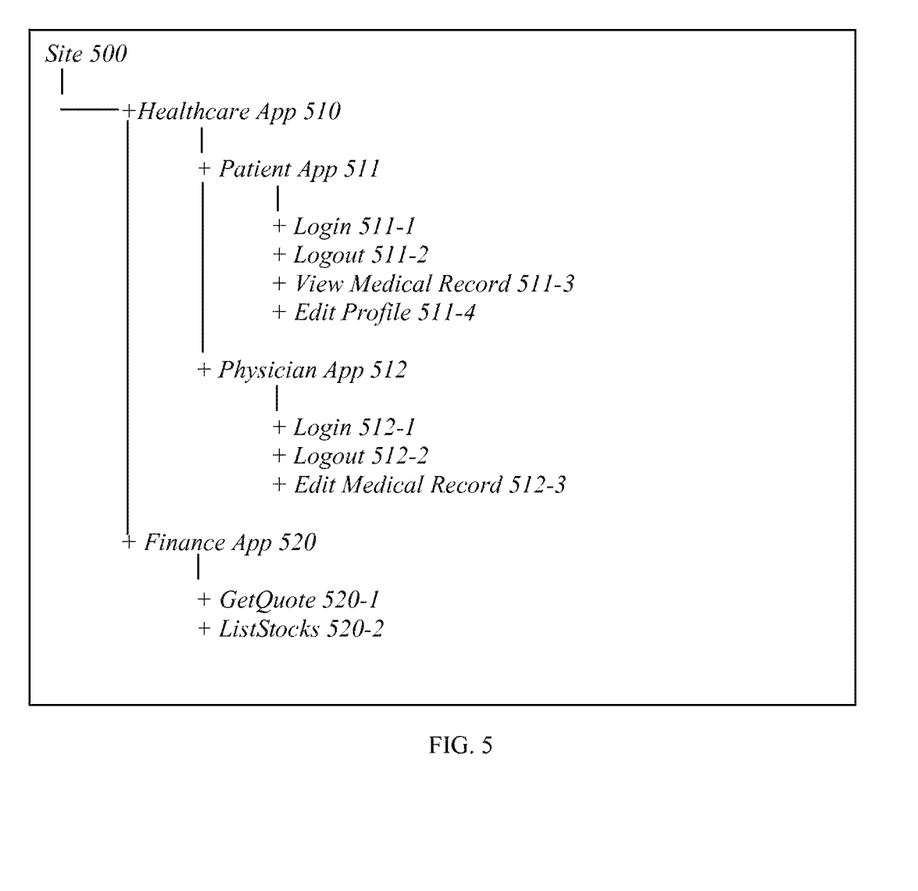
FIG. 5 is an exemplary diagram of a site tree.

FIG. 5 provides an example for a site tree. A web site 500 has two applications: a healthcare 510 and finance 520. Healthcare application 510 is composed of two applications, a patient 511 and a physician 512. Patient application 511 includes the transactions Login 511-1, Logout 511-2, View Medical Record 511-3, and Edit Profile 511-4. Physician application 512 includes the transactions: Login 512-1, Logout 512-2, and Edit Medical Record 512-3. Finance application 520 includes only the transactions GctQuote 520-1 and ListStocks 520-1.

Application learner 320 performs at least three tasks that include classifying, learning, and collecting. The classification includes determining, on-the-fly, for each context (i.e., parsed request) whether the incoming request belongs to a previously discovered application, and if so an application identification (ID) number is assigned to the context. Unidentified context messages may be further processed for the purpose of learning new applications and their transactions and modules. The collection task is invoked upon a reply message and it decides if the context should be collected. A context to be collected is saved, in a chronologic order, in database 360. The learning task is invoked every predefined period of time or whenever the number of collected contexts is above a predefined threshold. The teaming task processes data stored in database 360 and attempts to discover a new application using a plurality of application definers and correlation processes. The application definers include conditions that are checked against context data in database 360. An example for application definers are a path of a cookie, the name of the parameter name, and so on. If one of the application definers is satisfied, then a new application is found and inserted to the CDS in an entry of the relevant site. That is, a new entry is created and the application ID together with the URL are added to the entry. In one embodiment of the present invention, the learning of applications can also be performed by correlating a plurality of saved contexts that share a common property, such URL and parameter.

Monitor 330 executes all activities related to the generation of statistics respective of the operation of the web servers and their respective applications. The statistics include, but are not limited to, measuring throughput, response time, number of errors, and so on. The statistics are kept in database 380 on a per server basis, on a per application basis, and on a per application/server combination basis. In accordance with an embodiment of the disposed invention, a plurality of reports are produced based on the gathered statistics. These reports can be presented by means of a graphical user interface (GUI) and/or sent to a system administrator by email.

Controller 340 executes tasks that optimize the performance of each web application executed by the web and application servers. These tasks include, but are not limited to, scheduling requests to reduce response time, shaping traffic to balance the load, recovery actions when one of the servers fails, redirecting of requests, and so on. The controllers 340 tasks are performed according to a set of policies predetermined for each server, application, transaction, and module in an application. Generally, a policy defines an allowed value range for each status parameter and the actions to be taken if a status parameter is not within its range. Each policy is assigned with a priority and the time periods that the policy should be activated and the users it is relevant for, for example, a policy may define a maximum allowable latency value that is for an application and a threshold from which corrective actions should be taken. The corrective action may be, but is not limited to, the transfer of requests to a less busy server. As another example, a policy may define the minimum allowed throughput for an application and the corrective action may be stalling traffic directed to the server that executes the application. It should be noted that if a policy includes two or more corrective actions, then each of the actions may be assigned with a different priority.

Figure 4:
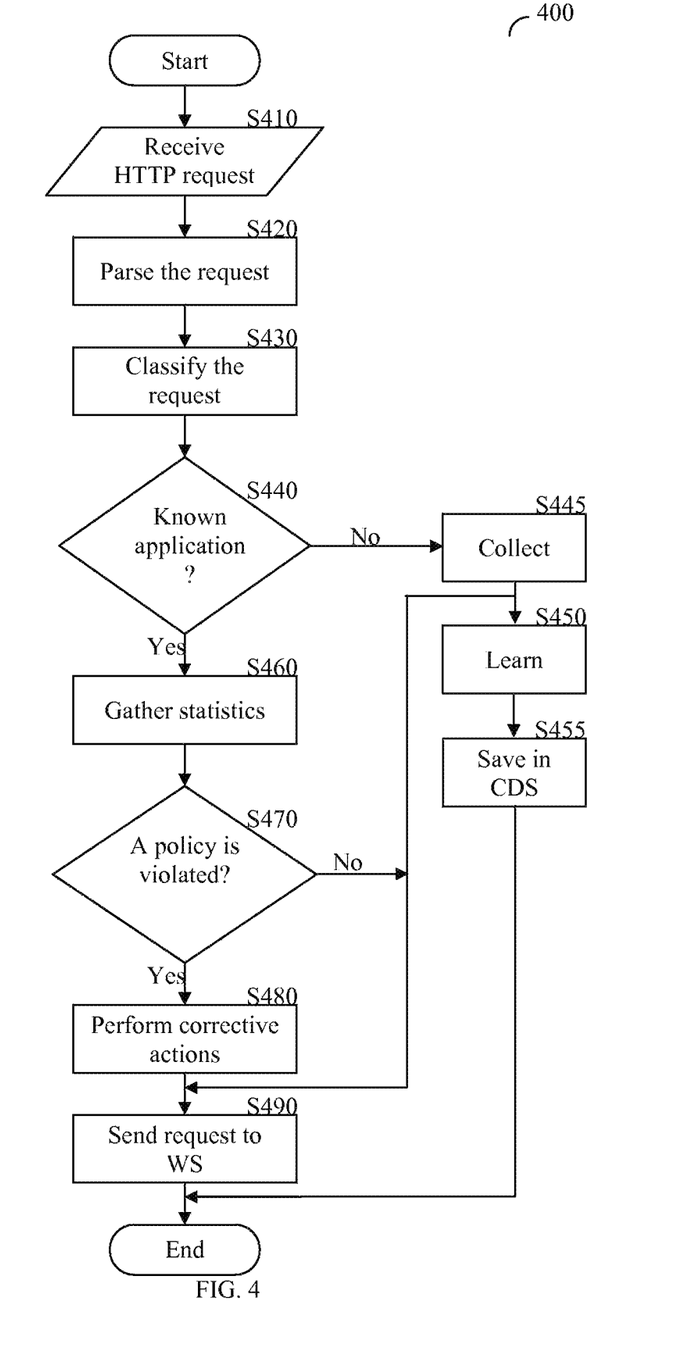
FIG. 4 is a flowchart describing the operation of the SLM system in accordance with an embodiment of the present invention.

FIG. 4 shows a non-limiting and exemplary flowchart 400 describing the operation of SLM system 280, in accordance with one embodiment of the present invention. At S410, an HTTP request sent from a client 210 is received at the SLM system 280. At S420, the HTTP request is parsed to generate a context of the request. At S430, the request is classified to determine whether the request belongs to a known or unknown application. This is performed by matching the context against the CDS and a plurality of classification filters and if the filtering result with an application ID, the incoming request belongs to a known (learnt) application. At S440, a check takes place to determine if an application ID was detected, and if so execution continues with S460; otherwise, executions proceeds to S445 where the context is saved in database 360. Subsequently, the context is sent to a web server 220. At S450, application learner 320 discovers the applications and preferably applications' transactions and modules related to the context. The learnt information is kept, at S455, in a CDS format in database 370.

At S460, statistics respective of the application are gathered. That is, at least the status parameters: throughput, response time, hits per second, latency and number of returned errors are measured and saved in database 380. At S470, it is checked if at least one of the policies defined for the application is violated. Namely, it is determined if the measured status parameters are within the allowed range, and if so execution proceeds to S490 where the request is sent to a web server 220; otherwise, execution continues with S480 where one or more corrective actions, as defined in the violated policy, are taken. Examples for such actions are discussed in greater detail above. The method described herein can be further utilized for processing HTTP replies sent horn web servers or application servers.

The SLM system 280 and method described herein further implement a feedback mechanism. Specifically, after a corrective action is taken, SLM system 280 monitors the result of the action, i.e., whether the monitored parameters values improved due to the corrective action or actions. Accordingly, SLM system 280 updates controller 340 with the next corrective actions to activate. For example, if an action has not made a difference, this action would be less likely to be activated when subsequent request is received.

In accordance with an embodiment of the present invention, SLM system 280 tracks transactions and actual users that access the web applications in servers 220 and 230. Tracking users is performed by: a) adding a token (e.g., a cookie) to the HTTP traffic; b) identifying existing cookies that are used by existing user-management mechanisms; c) tracking SSL sessions; or d) any combination thereof. The ability to track user activity allows for identit3'ing transactions. Specifically, SLM system 280 detects navigation routes of users, i.e., how users move between applications transactions; compares between the detected routes; and deduces from the collected information which parts of the mutes comprise independent transactions. It should be noted that not all navigation mutes are considered as transactions or identified as such.

It should be noted that various modifications, combinations, sub-combinations and alterations of the above-described embodiments may occur, as required, insofar as they are within the scope of the appended claims or the equivalents thereof.

The principles of the present invention may be implemented as a combination of hardware and software. The software may be implemented as an application program tangibly embodied on a program storage unit or computer readable medium. The application program may be uploaded to, and executed by, a machine comprising any suitable architecture, lbr example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof; which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof; are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

What is claimed is:

1. A method for controlling and maintaining a level of service of web applications, comprising:
   generating a context for each request sent from a client to a web server and for each reply sent from a web server to a client;
   determining whether the context belongs to an identified transaction;
   gathering statistics respective of the identified transaction;
   determining whether at least one policy predefined for the identified application is violated, wherein the application is an event-driven software program that is responsive to hypertext transfer protocol (HTTP) requests; and
   performing a plurality of corrective actions if at least one policy is determined to be violated.

2. The method of claim 1, further comprising:
   saving the context in a database if it is determined that the context does not belong to an identified transaction; and
   learning new applications using data stored in the database.

3. The method of claim 2, wherein the learning of the new applications is performed using at least one of an application definer, and a correlation process.

4. The method of claim 3, wherein learning new applications further comprising:
   discovering transactions and modules that construct each of the new applications, wherein each module is a group of the transactions; and
   generating a site tree on the basis of the discovered transactions and modules that construct each of the new applications which belong to a designated site.

5. The method of claim 3, wherein the request is at least a hypertext transfer protocol (HTTP) request.

6. The method of claim 5, wherein generating the context includes parsing the HTTP request.

7. The method of claim 4, wherein determining if the context belongs to an identified transaction, comprising:
   matching the context against a classify data structure (CDC) and a plurality of application filters.

8. The method of claim 6, wherein the CDC including: a list of identified sites, for each site a list of its web applications, and for each web application a list of transactions and modules that construct the web application.

9. The method of claim 7, wherein the gathered statistics include measures on at least one of: throughput, response time, number of errors, hits per second, and latency.

10. The method of claim 1, wherein the step of gathering statistics further comprising: producing a plurality of reports based on the gather statistics.

11. The method of claim 1, wherein the at least one policy is checked against the gathered statistics.

12. The method of claim 11, wherein the at least one policy defines at least one corrective action to be performed.

13. The method of claim 12, wherein a policy is determined for a web server, a web application, a module, and a transaction.

14. The method of claim 13, wherein the corrective actions include at least one of: scheduling requests to reduce response time, shaping traffic to balance the load, and recovery actions on web servers.

15. The method of claim 1 is configured to operate in the line of traffic.

16. A computer program product including a computer-readable, non-transitory medium comprising software instructions operable to enable a computer to perform a method for controlling and maintaining a level of service of web applications, comprising:
   generating a context for each request sent from a client to a web server and for each reply sent from a web server to a client;
   determining whether the context belongs to an identified web application;
   gathering statistics respective of the identified transaction;
   determining whether at least one policy predefined for the transaction is violated, wherein the application is an event-driven software program that is responsive to hypertext transfer protocol (HTTP) requests; and
   performing a plurality of corrective actions if at least one policy is determined to be violated.

17. The computer program product of claim 16, further comprising:
   saving the context in a database if it is determined that the context does not belong to an transaction application;
   learning new applications using data stored in the database.

18. The computer program product of claim 17, wherein learning of the new applications is performed using at least one of an application definer, and a correlation process.

19. The computer program product of claim 18, wherein learning new applications further comprising:
   discovering transactions and modules that construct each of the new applications, wherein each module is a group of the transactions; and
   generating a site tree on the basis of the discovered transactions and modules that construct each of the new applications which belong to a designated site.

20. The computer program product of claim 19, wherein the request is at least a hypertext transfer protocol (HTTP) request.

21. A method for controlling and maintaining a level of service of web applications, comprising:
   generating a context for each request sent from a client to a web server and for each reply sent from a web server to a client;
   determining whether the context belongs to an identified transaction;
   gathering statistics respective of the identified transaction;
   determining whether at least one policy predefined for the identified application is violated, wherein the application is an event-driven software program that is responsive to hypertext transfer protocol (HTTP) requests; and
   performing a plurality of corrective actions if at least one policy is determined to be violated, wherein the corrective actions include at least one of: scheduling requests to reduce response time, shaping traffic to balance the load, and recovery actions on web servers.

* * * * *